US006601274B2

(12) United States Patent
Gartsbeyn

(10) Patent No.: US 6,601,274 B2
(45) Date of Patent: Aug. 5, 2003

(54) STATIC LINE SNAP

(75) Inventor: Yakov Gartsbeyn, East Longmeadow, MA (US)

(73) Assignee: Capewell Components Company, LLC, South Windsor, CT (US)

( * ) Notice: Subject to any disclaimer, the term of this patent is extended or adjusted under 35 U.S.C. 154(b) by 0 days.

(21) Appl. No.: 09/994,406

(22) Filed: Nov. 27, 2001

(65) Prior Publication Data

US 2003/0097737 A1 May 29, 2003

(51) Int. Cl.[7] .............................................. F16B 45/02
(52) U.S. Cl. ...................................................... 24/599.8
(58) Field of Search ............................ 24/599.1–600.3, 24/600.9–601.4, 371, 373, 375, 376; 294/82.2

(56) References Cited

U.S. PATENT DOCUMENTS

| 227,221 | A | * | 5/1880 | Dillaby ........................ 24/599.6 |
|---|---|---|---|---|
| 380,286 | A | * | 3/1888 | Humphreys ................. 24/599.7 |
| 482,885 | A | * | 9/1892 | Wallace ....................... 24/598.4 |
| 495,416 | A | * | 4/1893 | Jones .......................... 24/599.6 |
| 612,194 | A | * | 10/1898 | Clough ....................... 24/598.9 |
| 644,699 | A | * | 3/1900 | Woodford ................... 24/598.2 |
| 797,941 | A | * | 8/1905 | Corbett ....................... 24/599.4 |
| 3,653,102 | A | * | 4/1972 | Crook, Jr. ................... 24/599.2 |
| 3,827,746 | A | * | 8/1974 | Byers .......................... 24/599.5 |
| 4,062,092 | A | * | 12/1977 | Tamada et al. ............. 24/599.4 |
| 5,480,202 | A | * | 1/1996 | Gloden ........................ 24/599.8 |
| 5,927,431 | A | * | 7/1999 | Klein, Jr. ........................ 182/3 |
| 6,421,888 | B1 | * | 7/2002 | Grenga et al. ............. 24/598.9 |

FOREIGN PATENT DOCUMENTS

FR          2766884 A1 *   2/1999    ........... F16B/45/02

* cited by examiner

*Primary Examiner*—James R. Brittain
(74) *Attorney, Agent, or Firm*—Alix, Yale & Ristas, LLP

(57) ABSTRACT

Disclosed is a static line snap comprising an elongated body having front and rear portions separated by an attachment portion. The attachment portion defines an attachment cavity with a lock end. A slot is defined by the front portion for entry to and exit from the cavity. An outer gate is mounted to the body front portion for pivotal movement between a lock position and a load position. An inner gate is mounted to the body rear portion for pivotal movement between a lock position and a load position. Pivotal movement of the outer gate toward the load position forces the inner gate toward the load position. Each gate is independently biased toward the lock position.

3 Claims, 4 Drawing Sheets

STATIC LINE SNAP

BACKGROUND OF THE INVENTION

The present invention relates generally to a connector or fastener for coupling a flexible member such as a rope, line or webbing to an anchoring point. In one preferred application, the snap assembly selectively couples a parachute static line to an anchor cable.

Existing static line snap assemblies are comprised of three major components. The first component comprises an elongated body that includes a hook with an opening. The hook and most of the body fit within a guard for sliding movement along the longitudinal axis of the body between an open position and a closed position. In the open position, the hook opening is exposed while in the closed position, the hook opening is covered by the guard. A push button type latch prevents free sliding movement of the body away from the closed position. The configuration and interaction of the existing snap assembly parts make use of this existing snap awkward. In order to open the snap, one must use both hands. The first hand grips the body and depresses the button latch. The second hand is required to pull the guard back, exposing the hook opening so that the snap assembly can be placed over an anchor line. This process is made even more difficult by the small size of the snap assembly and short length of the body projecting from the guard, both of which are difficult to grasp and actuate with, for example, a parachutist's gloved hands. In addition, a safety pin has to be installed in the existing static line snap to provide a redundant safety mechanism. The redundant safety mechanism prevents accidental release of the snap from the anchor cable as a series of parachutists exit the aircraft.

SUMMARY OF THE INVENTION

It is an object of the present invention to provide a static line snap assembly which may be used with one hand.

It is another object of the present invention to provide a static line snap assembly which provides redundant levels of security against release without use of a safety pin.

It is a further object of the present invention to provide a new and improved static line snap assembly which provides a dual level of anchor line retention.

It is a still further object of the present invention to provide a static line snap assembly which is robust in design and relatively economical to produce.

It is yet another object of the present invention to provide a highly reliable snap assembly which can be easily used in a variety of applications.

The objects of the invention are achieved by the use of a snap comprising an elongated body having means for connection to a flexible member and an attachment portion. The attachment portion comprises opposing front and back portions and defines an elongated attachment cavity having an internal back edge and an internal front edge. The attachment cavity includes a lock end. A slot, defined in the body front wall, longitudinally separates an arm from a mounting surface. The slot allows communication into and out of the attachment cavity. Preferably, the entry slot is intermediate the lock end and the attachment portion.

An elongated inner gate or latch comprises a free end and an opposing connection end. Joining the ends are a pivot face and an opposing lock face. The connection end is connected to the back wall for pivotal movement of the free end from a lock position wherein the free end is adjacent the front edge to a load position wherein the free end is adjacent the back edge. A bias member biases the inner gate free end toward the front edge. The connection end is advantageously bifurcated to define opposing wings with the back wall disposed between the wings.

An elongated outer gate or latch comprises a free end and an opposing connection end. Joining the ends are a pivot face and an opposing lock face. The connection end is connected to the front wall mounting surface for pivotal movement of the free end from a lock position wherein the free end is adjacent the front edge to a load position wherein the free end is adjacent the inner gate pivot face and the back edge. A bias member biases the outer gate free end toward the front edge. The connection end is advantageously bifurcated to define opposing wings with the back wall disposed between the wings.

Pivotal movement of the outer gate toward the load position allows contact of the outer gate free end with the inner gate pivot face. Continued movement of the outer gate toward the load position simultaneously pivots the inner gate from the lock position toward the load position. An anchor point must pass by both gates to be positioned within the lock end of the attachment cavity, and likewise, must pass by both gates to be withdrawn from the attachment cavity. Thus, the dual latch snap raises two barriers to the removal of a captured anchor point, providing a dual level of anchor point retention while at the same time allowing convenient, single-handed use. Preferably, the snap requires minimal force to attach and remove an anchor line while having a working load over 2,000 pounds. In one preferred application, a parachute static line is attached to the connection means. In this preferred application the snap is held in one hand and pushed over an anchor line within an aircraft to actuate the parachute after release from the aircraft.

BRIEF DESCRIPTION OF THE DRAWINGS

Other objects and advantages of the invention will be evident to one of ordinary skill in the art from the following detailed description made with reference to the accompanying drawings, in which.

DESCRIPTION OF THE PREFERRED EMBODIMENTS

Figure 1:
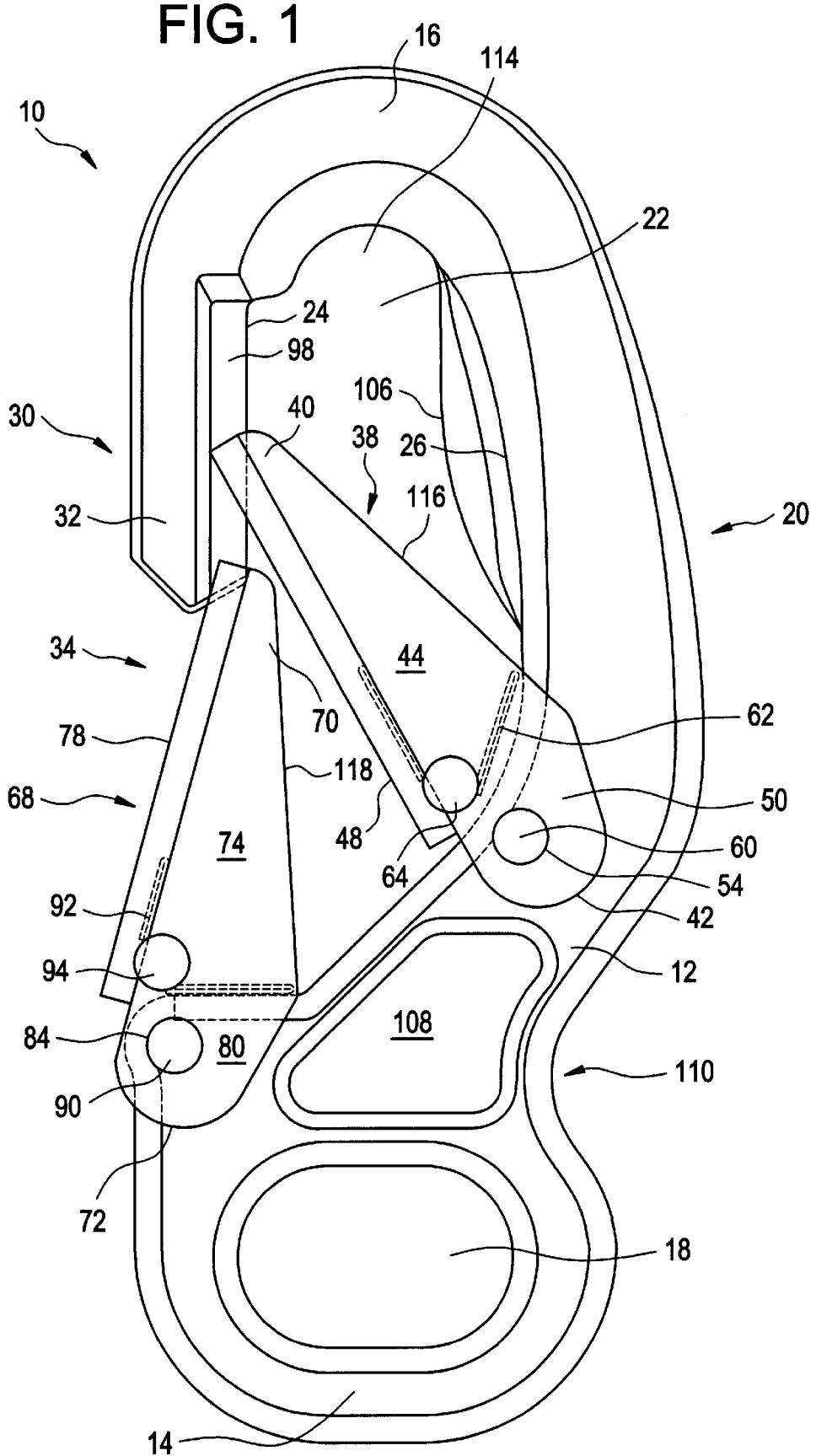
FIG. 1 is a side view, partially in phantom, of one embodiment of a snap with both latches in the lock position.

Referring now to the drawings, wherein like reference numerals indicate like parts throughout the figures, an inventive snap, generally designated by the numeral 10 is shown in FIG. 1. The snap 10 comprises an elongated unitary body 12. The body 12 comprises a connection end 14 and an opposing attachment end 16. The ends 14, 16 are connected by a back portion 20. As shown best in FIG. 2 the connection end 14 includes a means 18 for connection to a flexible member 28. The connection means 18 can be, for example, an aperture. In one preferred application, the flexible member 28 is a permanently attached parachute static line. The attachment end 16 defines an attachment cavity 22 bounded by internal front 24 and back 26 edges. A front portion 30 includes an arm 32 opposing the back portion 20 and separated therefrom by the attachment cavity 22. A slot 34 (shown best in FIG. 3) is defined in the front portion 30 to allow entry to and exit from the attachment cavity 22. Advantageously, the slot 34 is intermediate the body ends 14, 16. Further advantageously, the slot 34 allows an anchor point 36 of at least a one-half inch diameter entry to and exit from the attachment cavity 22.

Figure 4:
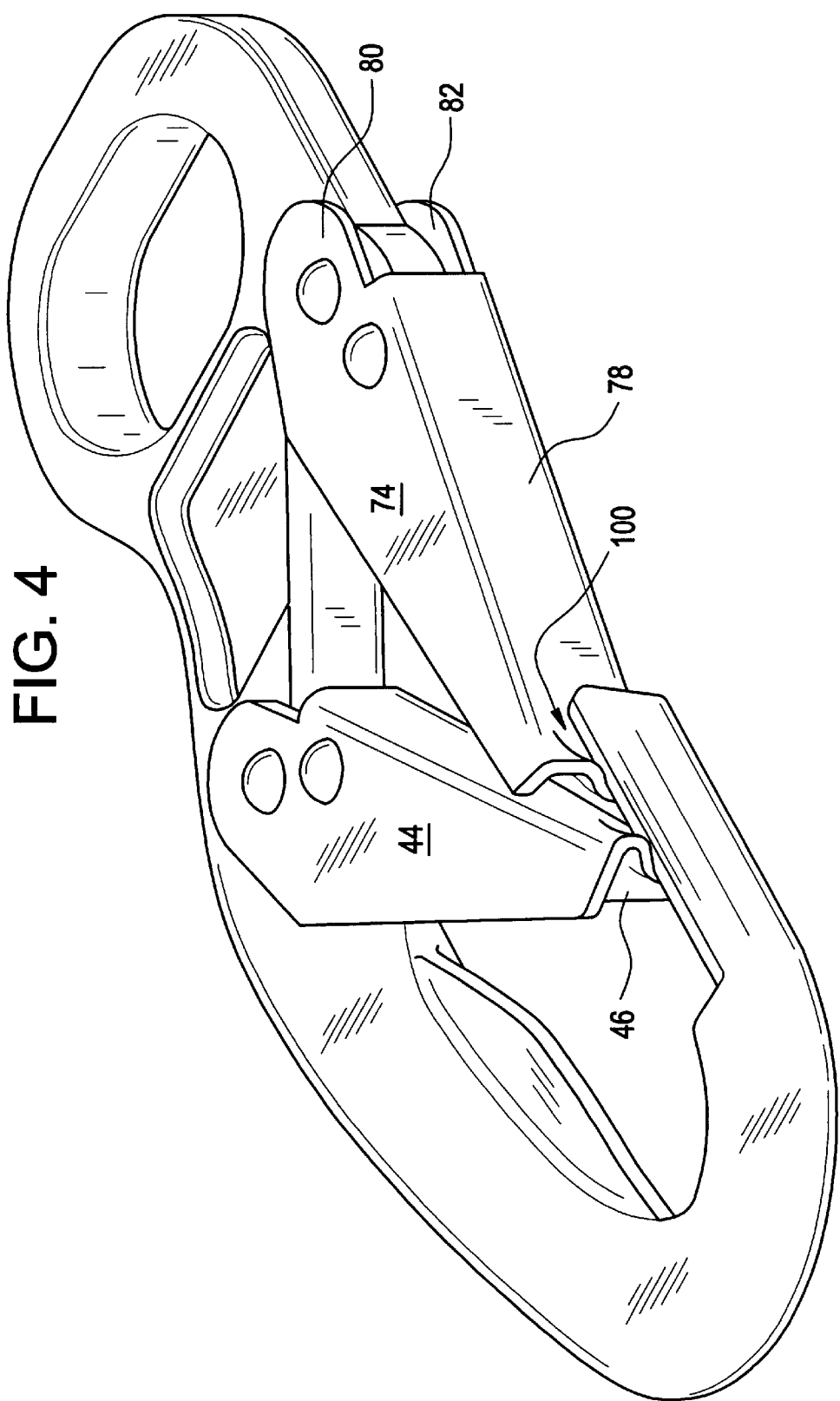
FIG. 4 is a perspective view of one embodiment of a snap with both latches in the lock position.

An elongated inner gate or retainer 38 comprises a free end 40 and an opposing connection end 42. The connection end 42 is mounted to the back portion 20 adjacent the back edge 26 for pivotal movement of the free end 40 from a closed or locked position, wherein the free end 40 is adjacent the front edge 24, to an opened or load position, wherein the free end 40 is adjacent the back edge 26. In one embodiment, the gate 38 is comprised of spaced side plates 44, 46 (shown best in FIG. 4) connected by a pivot face 48 to form generally a U-shaped structure. In some embodiments, the pivot face 48 terminates prior to the connection end 42 so that the connection end is bifurcated and defines opposing wings 50, 52 (only 50 shown). Each wing 50, 52 is positionable adjacent an opposing face of the body 12. Each wing 50, 52 defines an axially aligned aperture 54, 56 (only 54 shown). The wing apertures 54, 56 are alignable with a transverse aperture 58 (not shown) defined in the back portion 20. A pivot member 60 such as a rivet or bolt is positionable within the aligned apertures 54, 56, 58 to define a pivot axis about which the inner gate free end 40 has a limited range of movement. A bias member 62 such as a spring can be disposed substantially within the U-shaped space formed by the pivot face 48 and spaced side plates 44, 46 to provide a bias force for urging the gate 38 toward the closed position. Securing means 64 such as a pin, rivet or bolt can be used to secure the bias member 62 within the U-shaped space.

An elongated outer gate or retainer 68 comprises a free end 70 and opposing connection end 72. The connection end 72 is mounted to the body front portion 30 for pivotal movement of the free end 70 from a closed or locked position, wherein the free end 70 is adjacent the front edge 24, to an open or load position, wherein the free end 70 is adjacent to the inner gate 38 in the load position. Advantageously, the outer gate 68 is comprised of spaced side plates 74, 76 (only 74 shown) connected by a pivot face 78. In some embodiments the pivot face 78 terminates prior to the connection end 72 so that the connection end is bifurcated and defines opposing wings 80, 82 (shown best in FIG. 4). Each wing 80, 82 defines an axially aligned aperture 84, 86 (only 84 shown). The wing apertures 84, 86 are alignable with a transverse aperture 88 (not shown) in the body front portion 30. A pivot member 90 such as a rivet or bolt is positionable within the aligned apertures 84, 86, 88 to define a pivot axis around which the outer gate free end 70 has a limited range of movement. A bias member 92 such as a spring can be disposed substantially within the U-spaced space formed by the pivot face 78 and spaced side plates 74, 76 to provide a bias force for urging the gate 68 toward the closed position. Securing means 94 such as a pin, rivet or bolt can be used to secure the bias member 92 within the U-shaped space.

The mounting points of the inner gate 38 and the outer gate 68 allow the pivot arc of the outer gate free end 70 to intersect the inner gate pivot face 48. Therefore, when the outer gate 68 pivots from the closed position toward the open position, the outer gate free end 70 engages the inner gate pivot face 48 to thereby simultaneously urge the inner gate free end 40 toward the open position. Preferably, the gates 38, 68 pivot less than 90 degrees between the lock and load positions to further enhance the rapid attachment of the snap 10 to an anchor point. It should be noted that the engagement point of the outer gate free end 70 and the inner gate pivot face 48 can be modified to determine the force necessary to open both gates.

Advantageously, the inner gate 38 and outer gate 68 comprise substantially identical parts so that the inventive snap 10 can be assembled from a minimum number of different parts.

In one variation, an internal surface 98 of the arm 32 is tapered. In this embodiment, the outer gate free end 70 defines a notch 100 (shown best in FIG. 4) that can interengage with the arm-tapered surface 98 in the closed position. The inner gate free end 40 may also define a similar notch 102 (not shown) for similar interengagement with the arm-tapered surface 98. Interengagement of the notch 100, 102 with the tapered surface 98 provides additional support and strength for the gates 38, 68 and snap 10.

In another variation the internal back edge 26 comprises an internal rib 106. The internal rib 106 acts as a stop to control the position of the internal gate 38 at the open or load position. The internal back rib 106 prevents the side plates 44, 46 from undesirably overriding and engaging the sides of the back portion.

The body 12 may include recessed or skeletonized portions 108, 110 to lessen weight without appreciably reducing strength of the snap 10. Typically, the edges of the body 12 and gates 38, 68 would be chamfered or beveled or radiused to prevent abrasion or wear of attached components and to enhance manipulation and feel of the snap 10.

Figure 2:
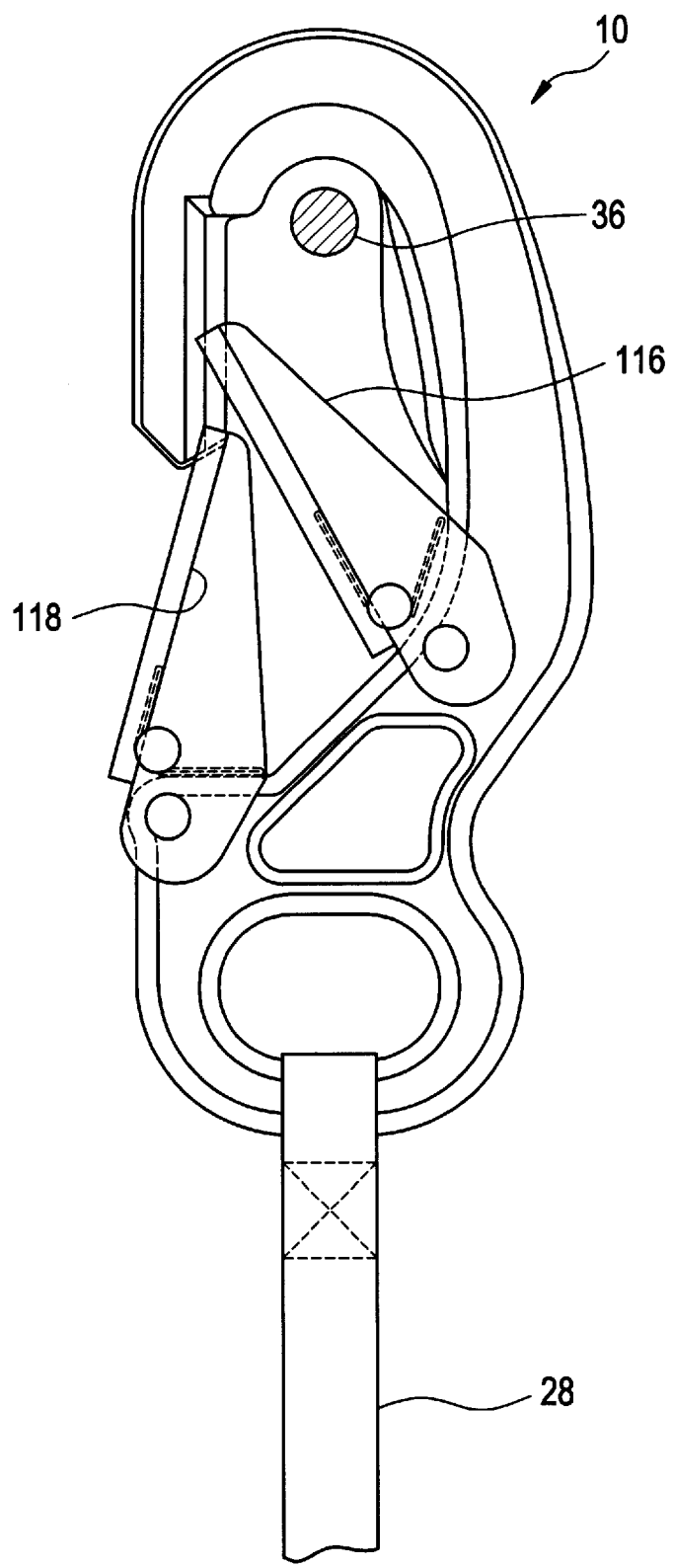
FIG. 2 is a side view of one embodiment of a snap in a preferred application with both latches in the lock position.
Figure 3:
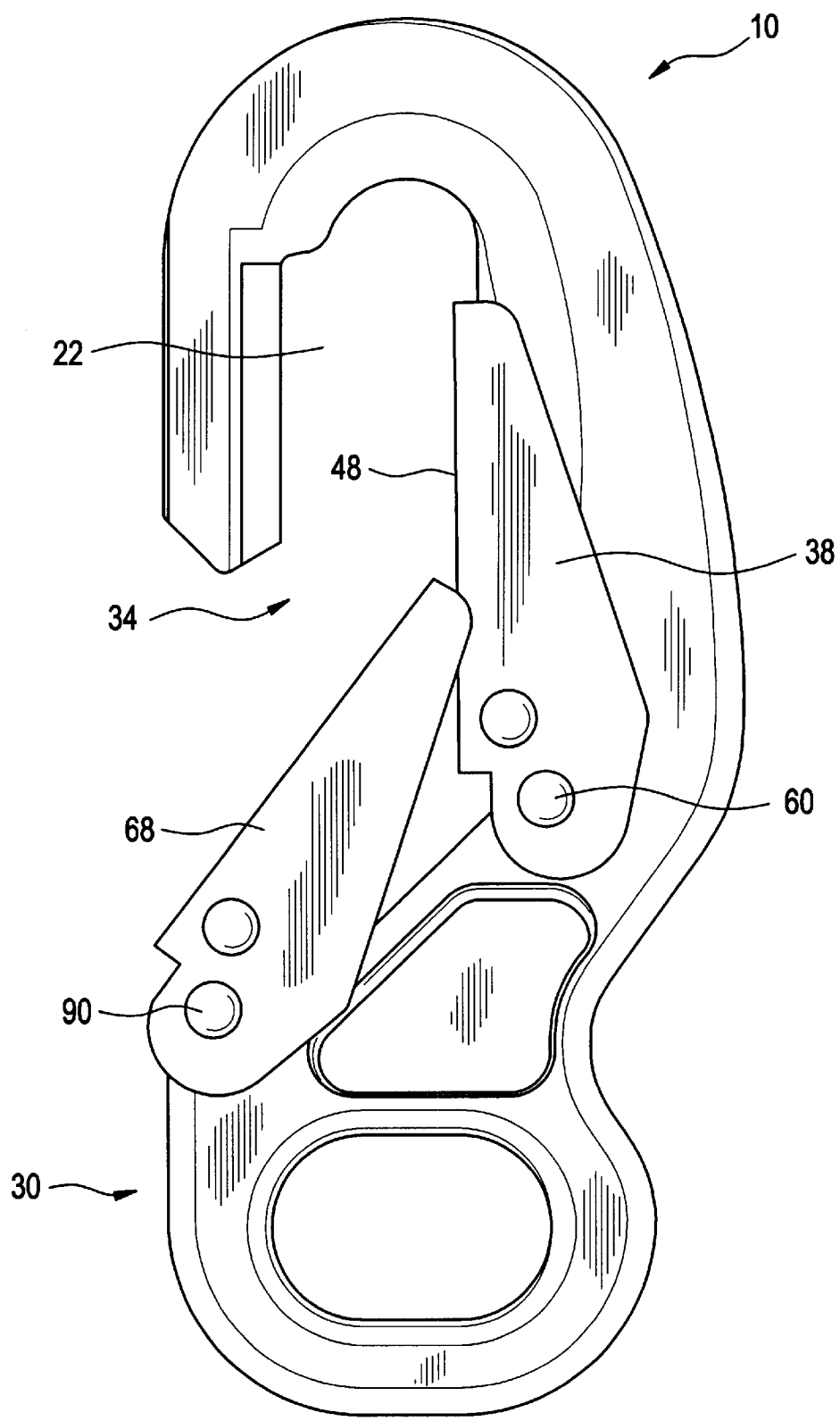
FIG. 3 is a side view of one embodiment of a snap with both latches in the load position.

In use for one preferred application, a user grabs the body 12 of the snap 10 adjacent the connection end 14 in one hand and pushes the outer gate 68 against an anchor point 36, which in this preferred application is an anchor cable. Continued movement of the snap 10 in this direction causes the anchor cable to push the outer gate 68 toward the load position, while at the same time moving the anchor cable into the slot 34. Subsequent continued movement of the snap 10 moves the outer gate free end 70 into engagement with the inner gate pivot face 48 and simultaneously urges the outer gate 68 and inner gate 38 toward the open or load position, guiding the anchor cable into the attachment cavity lock end 114. Once the anchor cable is free of the outer gate 68, that gate will be urged toward the closed or locked position by the bias member 92 independently of the inner gate 38. Once the anchor cable has moved passed the inner gate 38, that gate will be urged toward the closed position by the bias member 62. Once in the attachment cavity lock end 114, the anchor cable is trapped between the inner gate lock face 116 and the body 12 as shown in FIG. 2. Since pivotal movement of the inner gate 38 is limited, movement of the cable against the inner gate lock face 116 can not act to pivot the inner gate 38 away from the lock position. Even if the anchor cable was to move past the inner gate 38, movement of the cable against the outer gate lock face 118 can not act to pivot the outer gate 68 from the lock position. Further, since the outer gate 68 and inner gate 38 are independently biased, once the cable is within the attachment cavity lock end 114, inadvertent withdrawal of the anchor cable from the lock end 114 would require the unlikely failure of both bias members 62, 92 and gates 38, 68. Thus, the snap 10 provides a dual level of redundancy and safety in maintaining the anchor cable within the attachment cavity 22 without use of a safety pin. It should be appreciated that this sequence of operations requires only minor rapid movement of the dual gate snap 10 with a single hand of the user, the pivoting of each gate 38, 68 being automatic in response to movement against the anchor line.

To release the anchor line from the snap 10, the user applies force against the outer gate pivot face 78 using, for instance, a finger. This force pivots the outer gate free end 70 into engagement with the inner gate pivot face 48 and subsequently moves both gates 38, 68 into the open or load position. Once both gates 38, 68 are in the load position, movement of the attachment cavity lock end 114 away from the anchor cable moves the anchor cable past the gates 38, 68 and out of the snap 10 through the slot 34.

The inventive snap 10 in one preferred static line application is a significant improvement over prior static line snap assemblies which require both hands to use. Further, the inventive snap 10 provides an additional level of anchor line retention compared to prior static line snap assemblies that have only a single gate. The increased level of anchor line retention allows the inventive snap to eliminate the safety pin required with prior static line snap assemblies.

As will be apparent to persons skilled in the art, various modifications and adaptations of the structure above-described will become readily apparent without departure from the spirit and scope of the invention, the scope of which is defined in the appended claims.

What is claimed is:

1. A static line snap hook, comprising:

an elongated body defining an attachment cavity toward one end and means for connecting to a flexible member toward the opposing end, the body having front and back portions separated by the attachment cavity, the front portion comprising an arm spaced from an edge to define a slot therebetween, the slot allowing access to the cavity, the arm comprising an inwardly facing tapered surface;

an elongated inner retainer having a bifurcated end partially disposed over the back portion for limited pivotal movement of an opposing free end from a lock position wherein the free end is adjacent the arm to a load position wherein the free end is adjacent the back portion, a pivot face intermediate the bifurcated end and the free end, the free end defining a notch for interengagement with the arm tapered surface in the lock position;

a first spring generally contained within the inner retainer bifurcated end for biasing the inner retainer toward the lock position;

an elongated outer retainer having a bifurcated end partially disposed over the edge for limited pivotal movement of an opposing free end from a lock position wherein the free end is adjacent the arm to a load position wherein the free end displaces the inner retainer toward the inner retainer load position, the free end defining a notch for interengagement with the arm tapered surface in the lock position; and a second spring generally contained within the outer retainer bifurcated end for biasing the outer retainer toward the lock position;

wherein as the outer retainer moves from the lock position toward the load position the outer retainer engages the inner retainer pivot face to move the inner retainer from the lock position toward the load position.

2. The static line snap hook of claim 1, wherein the inner retainer and outer retainer comprise substantially identical parts.

3. The static line snap hook of claim 1, wherein:

the inner retainer bifurcated end comprises spaced wings, each wing defining an aperture therein, the inner retainer apertures being axially aligned with an aperture defined in the back portion;

means for securing the inner retainer to the body is disposed within the wing and back portion apertures;

the outer retainer bifurcated end comprises spaced wings, each wing defining an aperture therein, the outer retainer apertures being axially aligned with an aperture defined in the edge; and means for securing the outer retainer to the edge is disposed within the wing and back portion apertures.

* * * * *